United States Patent [19]

Coulmance et al.

[11] Patent Number: 5,226,078
[45] Date of Patent: Jul. 6, 1993

[54] ADJUSTABLE INTEGRATED/DISCRETE-ELEMENT LINE CURRENT CONTROLLER IN A TELEPHONE SET

[75] Inventors: Jean-Pierre Coulmance, Osny; Patrick Bailly, Caen, both of France

[73] Assignee: U.S. Philips Corporation, New York, N.Y.

[21] Appl. No.: 699,841

[22] Filed: May 14, 1991

[30] Foreign Application Priority Data

May 15, 1990 [FR] France ............................... 90 06036

[51] Int. Cl.[5] ............................................. H04M 1/00
[52] U.S. Cl. .................................. 379/413; 379/412; 379/394
[58] Field of Search ............... 379/413, 412, 394, 398, 379/399, 400, 401, 387; 363/21, 217

[56] References Cited

U.S. PATENT DOCUMENTS

| 4,626,626 | 12/1986 | Coulmance | 379/413 |
| 4,731,830 | 3/1988 | Thomson | 379/387 |
| 4,841,566 | 6/1989 | Lott | 379/387 |
| 5,014,308 | 5/1991 | Fox | 379/413 |
| 5,121,425 | 6/1992 | Reicheit | 379/387 |

Primary Examiner—James L. Dwyer
Assistant Examiner—Jack Chiang
Attorney, Agent, or Firm—David R. Treacy

[57] ABSTRACT

A telephone set having a voltage gain and control circuit element in series with the main current path of a line current control transistor, connected between first and second line end portions. The line current control transistor is connected between the first line end portion and the modulation terminal of the voltage gain and control circuit. A line current measuring resistor is connected between the reference terminal of the voltage gain and control circuit element, and the second line end portion. The rise of line current above a threshold is controlled by a second transistor connected between a threshold voltage source and the control electrode of the line current control transistor. The second transistor is also controlled by a compensating diode connected between the control electrode of the second transistor and the line current measuring resistor.

20 Claims, 2 Drawing Sheets

ADJUSTABLE INTEGRATED/DISCRETE-ELEMENT LINE CURRENT CONTROLLER IN A TELEPHONE SET

BACKGROUND OF THE INVENTION

The present invention relates to a circuit arrangement for a telephone set, comprising a voltage gain and control circuit element inserted between a first and a second line end portion, which portions are connected to a diagonal of a rectifier bridge having a telephone line connected to the other diagonal of this bridge. The gain and control circuit element has at least one modulation terminal coupled to the first line end portion, and a reference terminal coupled to the second line end portion via a line current measuring resistor element to provide a reference voltage, said telephone set further including a line current control circuit which includes a first field effect transistor and/or high-gain bipolar transistor whose main current path is located in the branch between the first and second line end portions which includes the voltage gain and control circuit element This main current path may be used to provide a voltage drop in this branch.

Such a circuit arrangement for a telephone set is known from European Patent Application No. EP-A 0 146 183, to which U.S. Pat. No. 4,626,626 corresponds, which particularly discusses the use of an integrated circuit which ensures the main functions as regards transmission, reception and actual supply voltage control, for example, an integrated circuit commercially available under the name of TEA 1060 (or its derivatives) marketed by PHILIPS.

Since the standards to be satisfied by the telephone sets are changed relatively frequently and, in addition, these standards considerably vary from one country to another, it is not possible to provide entirely integrated circuits which ensure all the basic functions of the telephone set without adding external components with which it is possible to adjust the operation so that particular regulations which are applied in the territory where the circuits are used are taken into consideration.

It is a known fact that as a result of the integration of ever more complex functions in circuits manufactured on a large scale, a considerable price reduction is achieved for the arrangements both as regards the number of components and as regards the labour cost necessary for the assembly. Since external components have to be added to an integrated circuit, as is the case in a telephone set for the reason which has just been given, there is a problem of making as sensible a selection as possible while enabling a manufacturer to minimize the quantity and price of the external components. Nevertheless, it should still be possible by means of these components to precisely determine the operating conditions desired under any particular circumstances.

Due to the fact that the length of the connecting line of a telephone set may vary considerably, the line current which appears the moment the receiver is lifted off the hook may also vary considerably and, therefore, the standards frequently require that this current be limited to a maximum value when the line is very short, so that unless and, furthermore, annoying energy loss is avoided when specific switches are in operation. The circuit that provides such a line current limitation or a current control necessitates the presence of a certain number of external components because of relatively high voltages these components may be subjected to (and, more specifically, said first transistor which produces a line voltage drop which may exceed the permissible voltage in an integrated circuit of current technology) as well as other associated components such as resistors whose value may be chosen at random to fix the current limit necessary for satisfying the standard.

The circuit arrangement described in U.S. Pat. No. 4,626,626 makes a relatively large number of external components necessary and thus leads to a structure of the telephone set whose operation is certainly technically satisfactory but for which a lower cost price would be desirable.

SUMMARY OF THE INVENTION

Therefore, it is an object of the invention to provide a perfecting of the arrangement of the prior-art circuit which permits more components being integrated in integrated circuits and leaves as external components only the bare minimum indispensable for performing the adjustments required by the standards which differ from one country to the next.

According to the invention, a circuit arrangement for a telephone set as defined in the introductory paragraph is characterized in that the main current path of the first transistor is inserted between the first line end portion and the modulation terminal of the gain and control circuit element, and the gate electrode of the first transistor is connected to the resistor element via a control circuit.

According to a first embodiment of the invention said gain and control circuit element comprises at least one supply terminal, the gate electrode of the first transistor being fed by a bias resistor in view of the conductance of this transistor, characterized in that the bias resistor is fed from this first end portion, in that the control circuit comprises a second transistor for controlling the first transistor, the base of the second transistor receives the voltage developed in the current measuring resistor element after filtering by a low-pass filter via a compensating diode, and the collector of the second transistor is connected to the bias resistor of the first transistor, the junction point between the base of the second transistor and the compensating diode being fed from the supply terminal via a current source, and in that the emitter of the second transistor is connected to a threshold voltage source having a given internal impedance, which threshold voltage is established in proportion to the reference voltage.

This is an advantageous version of the control circuit. Needless to there are various versions of the control circuit useful with the invention.

The first transistor is a field effect transistor, or a bipolar equivalent, that is, a high-gain transistor known by the name of Darlington transistor or a combination of field effect and bipolar transistors. The fact that the main current path of this first transistor is located between the first line end portion and the modulation terminal of the gain and control circuit element is advantageous in that the maximum voltages applied to the gain and control circuit element are not very high compared to the reference voltage and that thus the second transistor as well as the compensating diode and the current source feeding the junction point between the base of this second transistor and the compensating diode can be integrated together with the gain and control circuit element and thus leads to a considerable saving.

Furthermore, the circuit arrangement according to the invention shows a behaviour which, in essence, is different from that of the prior-art circuit due to fact that the emitter of the second transistor is connected to a finite impedance voltage source whose value may be chosen at will by external components, and forms a linear voltage gain with the bias resistor of the first transistor. This produces a voltage drop on the bias resistor of the first transistor which drop is proportional to the D.C. voltage developed on the current measuring resistor element when the resistor element exceeds a threshold fixed by the threshold voltage source which has a given internal impedance. The invention provides the advantage that an evaluation of the line length may simply be made by measuring the line current (voltage developed on the current measuring resistor element) thus, the attenuation caused by the line length may easily be compensated in the gain and control circuit element.

According to a second embodiment of the invention the circuit arrangement is characterized in that the threshold voltage source is constituted by a voltage generator having a low internal impedance whose output terminals are interconnected by a divider bridge of two resistors, whereas the point in the middle of this divider bridge constitutes the threshold voltage source output having a specific impedance. In a preferred practical embodiment of said voltage generator a structure termed a band gap voltage generator is used. This is well known to those skilled in the art and provides a stable 1.2 V voltage which by means of a divider bridge constituted by two resistors can be brought, for example, to a threshold voltage of the order of 0.6 V whose impedance will be fixed by the value of the two resistors of the bridge in a parallel combination. Also in this case the band gap voltage generator may easily be integrated at the same time as the gain and control circuit element.

In a third embodiment of the invention said threshold voltage source is constituted, on the one hand, by a resistor inserted between the emitter of the second transistor and the reference voltage, and on the other hand, by a threshold current source, feeding aforesaid resistor from the supply terminal. In this case the resistor concerned may be an external component so that a choice may be made as to the internal impedance of the threshold voltage source. The supply voltage source, however, may advantageously be integrated at the same time as the gain and control circuit element.

Advantageously, the current measuring resistor element is constituted by two series-arranged measuring resistors while the base of a third transistor is connected to the point shared by the two current measuring resistors, its emitter to the second line end portion and its collector to the gate electrode of the first transistor. With the aid of this third transistor the protective function of the telephone set in case of accidental line overload is ensured by the fact that when the threshold voltage of the third transistor is surpassed, which brings the gate electrode of the first transistor to a voltage close to the reference voltage, the accidental overload is absorbed by the voltage drop of the first transistor.

Here again this third transistor may be integrated at the same time as the gain and control circuit element.

A further function called the loop-opening function consists of interrupting the line current especially during dialling and may easily be ensured with the circuit arrangement according to the invention by the fact that a fourth transistor receives on its base control pulses for the opening of the loop, the emitter of this fourth transistor is connected to the reference voltage and its collector is connected to the gate electrode of the first transistor. Again, this fourth transistor easily permits integrating the gain and control circuit element at the same time.

A variant of the circuit arrangement according to the invention is further characterized in that said low-pass filter which is constituted by a filter resistor inserted between the reference terminal of the gain and control circuit element and the compensating diode, and by a smoothing capacitor whose one end is connected to the point shared by the filter resistor and the compensating diode and whose other end is connected to the reference voltage over the main current path of a fifth transistor called a switching transistor, receiving at its gate electrode the loop-opening control pulses, the polarity of this switching transistor being chosen to ensure an interruption of the connection from the smoothing capacitor to the reference voltage in parallel with the opening of the loop.

This variant presents the advantage of eliminating the charging and discharging transients of the smoothing capacitor while the loop-opening operation is being performed.

The following description with respect to the annexed drawings will make it better understood how the invention may be realised.

DESCRIPTION OF THE PREFERRED EMBODIMENT

Figure 1:
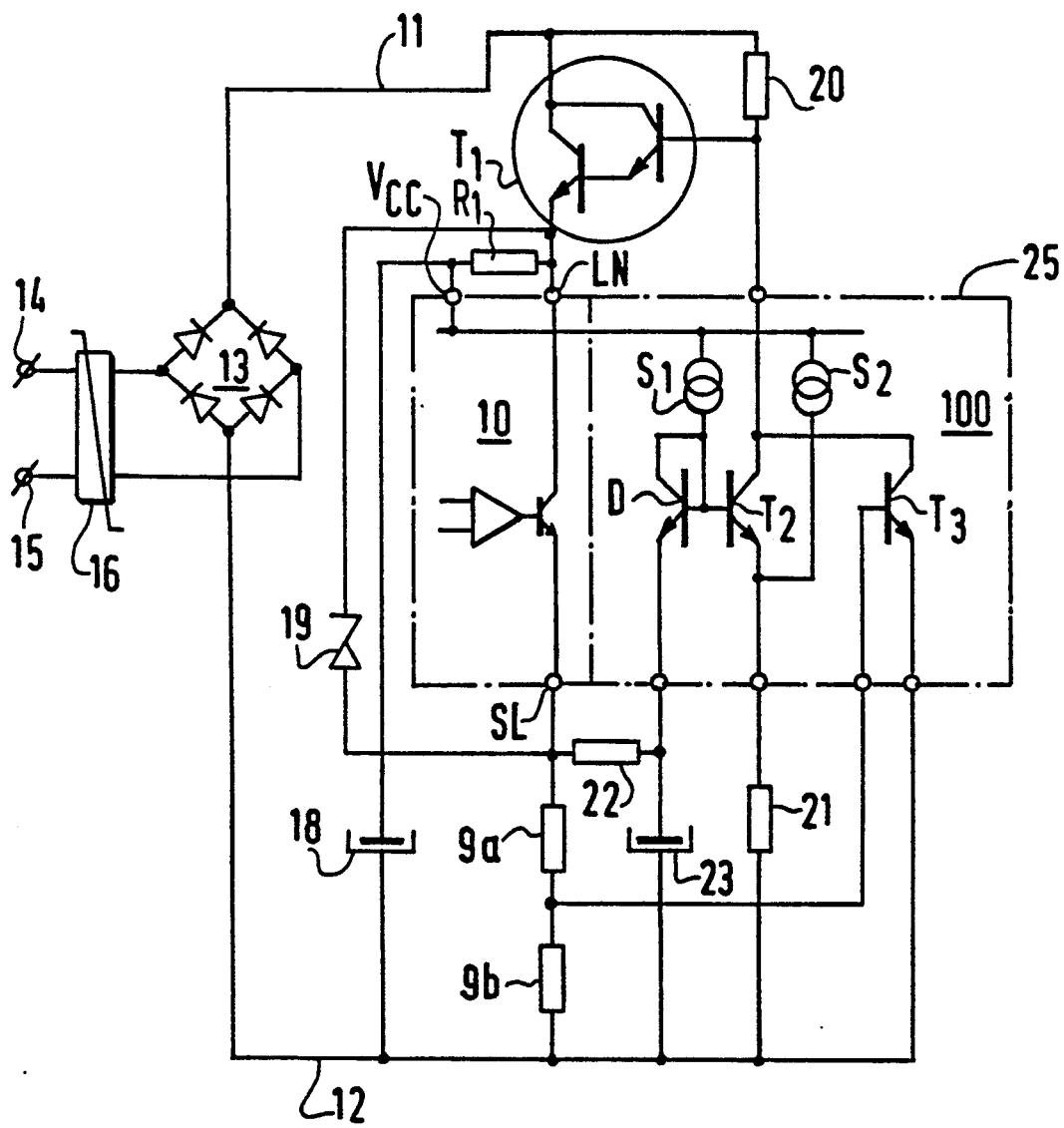
FIG. 1 represents a diagram of the circuit arrangement according to the invention in a first embodiment.

FIG. 1 shows the simplified diagram of a telephone set comprising a voltage gain and control circuit element 10 which is inserted between a first line end portion 11, and a second line end portion 12, which portions are connected to a diagonal of a rectifier bridge 13 receiving at its other diagonal the two wires of the telephone line via the terminals 14 and 15 through a passive protective circuit element 16. The gain and control circuit element 10 comprises, for example, a modulation terminal LN, a reference terminal SL and a supply terminal $V_{CC}$ which is connected to the terminal LN through a resistor $R_1$ of the order of 600 Ohms and also to the second line end portion 12 via a reservoir capacitor 18.

The gain and control circuit element 10 specifically performs a voltage control function by absorbing current over the line so that, when the second line end portion 12 is taken as a reference voltage, the voltage presented by the terminal LN lies between about 4 and 5 volts. On the basis of the voltage of the terminal LN, which comprises a D.C. component as well as a modulation signal, a D.C. voltage is produced on the terminal $V_{CC}$ through the resistor $R_1$ which is stabilized by the capacitor 18 and is used for feeding the gain and control circuit element 10. A zener diode 19 is connected between the terminals LN and SL and restricts the voltage to 8.2 V, for example, during the period of transition of the lifting of the receiver.

The reference terminal SL of the gain and control circuit element 10 is coupled to the second line end portion 12 through a current measuring resistor element comprising two resistors 9a and 9b in a series combination. The circuit values are selected such that the D.C. voltage drop in the set of the two resistors 9a and 9b does not exceed 1.2 V. This voltage drop compared to the reference voltage specifically permits correcting the gain of the modulation amplifiers between certain limits so that the length of the telephone line is taken into consideration, in a fashion known per se and described in the instruction manual of the integrated circuit TEA 1060 and its derivatives, published by the manufacturers of these integrated circuits.

The modulation terminal LN of the gain and control circuit element 10 is intended to be coupled to the first line end portion 11. However, due to the fact that the gain and control circuit element is provided for creating a fixed voltage of the order of 3 to 4.2 volts between its terminals by absorbing line current in the fashion of a zener diode, certain regulations and especially the French standard necessitate a restriction of the line current, especially when the line is short.

Therefore, a line control circuit is provided which comprises a first transistor $T_1$ whose main current path is incorporated in a loop between the first and second line end portions 11, 12 while the transistor $T_1$ intended to produce a voltage drop in the line thus permits controlling the line current. In the example represented in FIG. 1 the first transistor $T_1$ is a Darlington transistor whose main current path is located between the first line end portion 11 and the modulation terminal LN of the gain and control circuit element 10. The gate electrode of the first transistor $T_1$ is fed from the first line end portion 11 through a bias resistor 20 and provides conductance of this transistor once the telephone line has been fed with a voltage exceeding the threshold voltage of the first transistor $T_1$ augmented by the line-free voltage of the diode bridge 13.

The line current control circuit also comprises a second transistor $T_2$ whose collector is connected to the junction point between the bias resistor 20 and the gate electrode of the first transistor $T_1$, and whose emitter is connected to the reference voltage via an emitter resistor 21. The base of the second transistor $T_2$ is coupled to the reference terminal SL of the gain and control circuit element 10 by means of a compensating diode D represented in the Figure by a transistor arranged as a diode, and a low-pass filter formed by a series resistor 22 and a smoothing capacitor 23 for a by-pass to the reference voltage. The base of the second transistor $T_2$ is fed with voltage $V_{CC}$ by means of a current source $S_1$. The line current control circuit is finally completed by a threshold current source $S_2$ which feeds the emitter resistor 21 of the second transistor $T_2$ from the voltage $V_{cc}$.

The operation of the line current control circuit may be explained in the following manner.

In the low-pass filter 22, 23 a value for the resistor 22 is chosen which produces a negligible voltage drop on this resistor while the small current produced by the current source $S_1$ is taken into consideration. The ensemble formed by the compensating diode D and the second transistor $T_2$ forms a comparing circuit which reproduces on the emitter of the second transistor $T_2$ a D.C. voltage which is substantially equal to the value of the D.C. voltage present on the reference terminal SL of the gain and control circuit element 10.

Two cases are to be considered:

when the D.C. voltage presented by the reference terminal SL falls short of the threshold voltage produced on the emitter resistor 21 by the current of the threshold current source $S_2$, the current of the current source $S_1$ flows through the compensating diode D, and the second transistor $T_2$ is not conductive. In this case the first transistor $T_1$ is fed and remains conductive. This case would correspond to a very long telephone line in which the voltage drop would be so great that it would not be necessary to produce an additional voltage drop by means of the first transistor $T_1$;

in the second case, which is in fact the more general of the two, the D.C. voltage of the reference terminal SL is higher than the threshold voltage developed by the threshold current source $S_2$ over the resistor 21. The second transistor $T_2$ thus produces the additional current which is necessary for its emitter voltage to come in the neighbourhood of the D.C. voltage of the reference terminal SL. The collector current of the second transistor $T_2$ causes a voltage drop in the bias resistor 20 of the first transistor $T_1$ which causes in its turn an equivalent voltage increase in the main current path of this transistor. Finally, the balancing conditions for a given telephone line may be written according to the following equation:

$$\Delta V_{T1} = \Delta V_{SL} \cdot \frac{R_{20}}{R_{21}}$$

in which equation $\Delta V_{T1}$ represents the voltage drop increase in the first transistor $T_1$ to beyond its threshold voltage (about 1.2 volts for a Darlington transistor), $\Delta V_{SL}$ represents the voltage increase of the reference terminal SL due to the line current measured by the current measuring resistors 9a and 9b, and $R_{20}/R_{21}$ represents the ratio of the value of resistor 20 to that of resistor 21 respectively.

As $V_0$ is the threshold voltage to which the circuit is referenced and which is produced by the voltage drop in the resistor 21 due to the threshold current source $S_2$, this voltage $V_0$ has an internal resistance whose value may be chosen by means of resistor 21 whilst the slope of the voltage variations at the terminals of the transistor $T_1$ as a function of the voltage variation on the reference terminal SL may be chosen by means of the bias resistor 20.

The line current control circuit associated with the voltage gain and control circuit element 10 has a current characteristic as a function of the line voltage, which presents a first part that corresponds to the fact that the second transistor $T_2$ is not conductive and permits the first transistor $T_1$ being conductive once its own threshold has been exceeded. In this part with low line-voltages the ensemble has a very low internal impedance, then after a bend which corresponds to the fact that the second transistor $T_2$ is rendered conductive, when there is a line voltage increase, the increase of the current absorbed by the circuit ensemble linearly varies by the factor of $(1/R_9) \cdot (R_{21}/R_{20})$ with the line voltage, in which expression $R_9$ represents the sum of the resistances 9a and 9b. After a current supplied by the threshold current source $S_2$ is fixed, the position of the bend in the current-voltage characteristic of the circuit arrangement can still be changed at will by changing the value of the resistor 21, as well as the slope of the line current control by the ratio of the resistors 9a, 9b, 21 and 20.

As shown in FIG. 1 the circuit arrangement according to the invention can also very simply provide an additional protective function against accidental overload of the telephone line by means of a third transistor $T_3$ whose emitter is connected to the reference voltage, its collector to the gate electrode of the first transistor $T_1$ and whose base is connected to the centre of the bridge formed by the two resistors $9a$ and $9b$ which constitute the line current measuring resistor element. The individual values of the resistors $9a$ and $9b$ are chosen in such a way that for a boundary current value and an accidental line current value the conductance threshold of the third transistor $T_3$ is exceeded which results in decreasing the gate electrode value of the first transistor $T_1$ relative to the reference voltage, and thus produces a high voltage drop in the first transistor $T_1$ which thus protects the whole circuit arrangement when the overload is continued.

Apart from the first transistor $T_1$ and its bias resistor 20, the rest of the circuit arrangement described in the embodiment is subjected to D.C. voltages which are only slightly higher, of the order of only 5 or 6 volts, than the reference voltage presented by the second line end portion 12, so that a large part of the elements constituting this circuit arrangement may now be integrated at the same time and in the same circuit as the gain and control circuit element 10. This is symbolically shown in FIG. 1 by the dash-and-dot lined box 25 around a circuit section 100 which comprises the current sources $S_1$ and $S_2$ as well as the diode D and the transistors $T_2$ and $T_3$, while these elements are advantageously integrated in the gain and control circuit element 10.

The components outside the integrated circuit which are used for the greater part for determining the operating conditions of the described circuit arrangement may have the indicative values which will be given below:

| Resistors | | Capacitors | |
| --- | --- | --- | --- |
| ref | value | ref | value |
| | Ohms | | μFarads |
| $R_1$ | 620 | | |
| 9a | 15 | 18 | 100 |
| 9b | 5 | 23 | 6.8 |
| 20 | 330K | | |
| 21 | 5.6K | | |
| 22 | 15K | | |

When a first transistor $T_1$ whose current gain is of the order of 10,000, a current source $S_1$ producing 2.5 μA, and a threshold current source $S_2$ producing 100 μA are used, the described circuit arrangement produces a bend in the characteristic which bend is situated at a line current of 28 mA, for a line voltage (on the terminals 14 and 15 before the diode bridge 13) near to 8.3 volts. For a line voltage beyond this bend the circuit arrangement presents an apparent internal impedance of about 1,200 Ohms, which provides a linear increase of the line current as a function of the line voltage. For example, a line current of 55 mA is attained for a line voltage of 40 volts.

Figure 2:
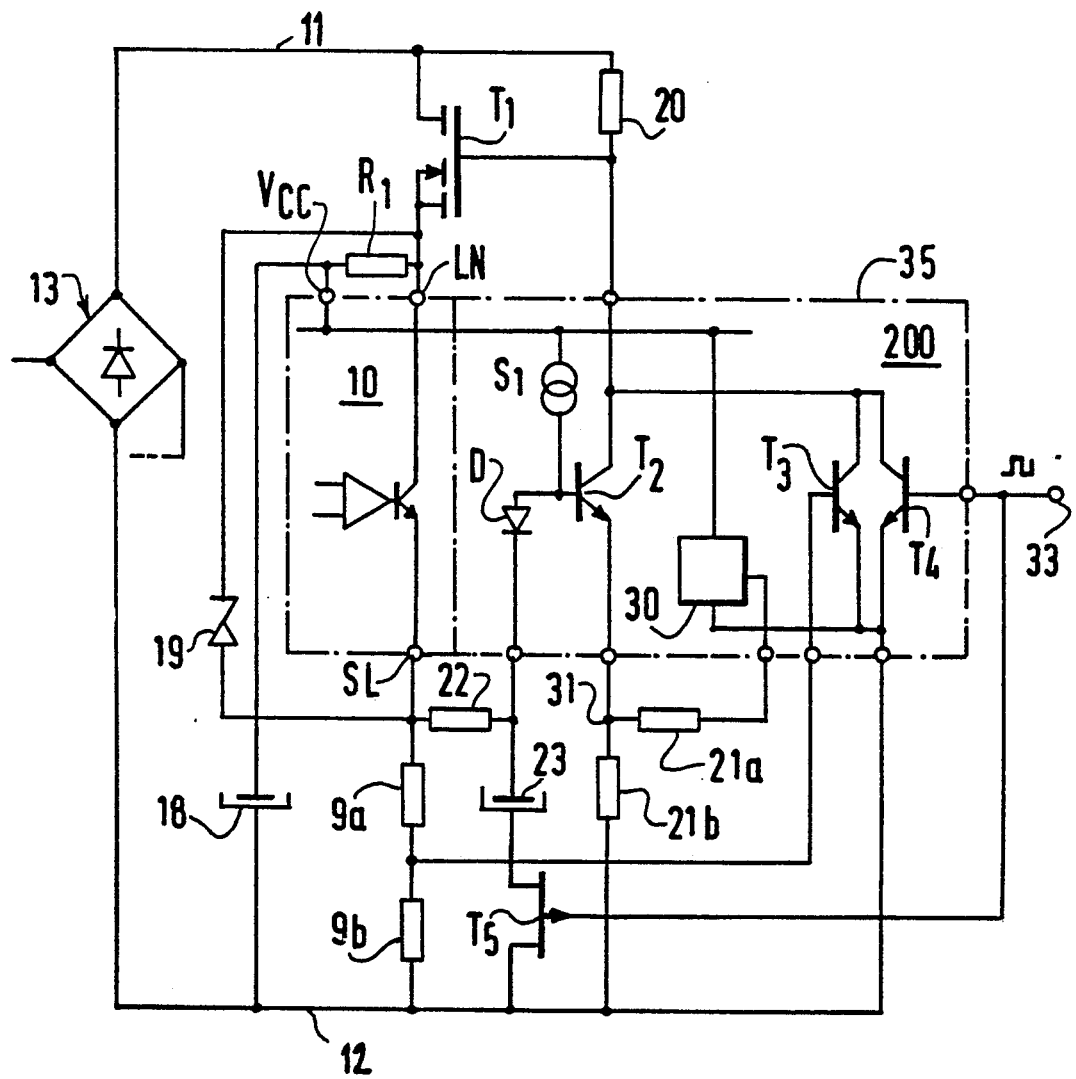
FIG. 2 shows the diagram of a second embodiment of a circuit arrangement according to the invention which includes a loop-opening function.

FIG. 2 represents a second embodiment of the circuit arrangement according to the invention. This circuit arrangement has a specific number of elements of the circuit shown in FIG. 1 which have been denoted by the same reference characters and whose function will not be described once again.

A first difference of the circuit shown in FIG. 2 compared to the one shown in FIG. 1 resides in the manner in which the threshold voltage is obtained which permits fixing the bend in the line current/line voltage characteristic. Here the characteristic is realised by means of a voltage generator 30 of the band gap type which produces a very stable temperature adjusted voltage of about 1.2 volts at a first end of a resistor $21a$ whose other end is connected to the emitter of the second transistor $T_2$. The emitter of the second transistor $T_2$ is connected to the reference voltage through a resistor $21b$ so that the junction point 31 between the resistors $21a$ and $21b$ presents a threshold voltage which may be determined by the ratio of resistor $21a$ to $21b$, whereas the internal impedance of this voltage source, seen from the emitter of the second transistor $T_2$, is equal to the equivalent resistance of the parallel combination of the resistors $21a$ and $21b$.

The protective function for the telephone set in case the line is overloaded is realised in the same fashion as in the first embodiment by means of a third transistor $T_3$ connected and operating in the same fashion. The first transistor $T_1$ in the present embodiment is a field effect transistor of the N-channel MOS type operating as an enhancement type or a depletion type field effect transistor. If a transistor operating in the enhancement mode is selected, its threshold voltage is preferably lowest possible, for example, of the order of only 1.5 volts.

In the diagram given as an example in FIG. 2 there is denoted how a line current interrupt function, especially during dialling, may be realised in a very simple manner with the circuit arrangement according to the invention. This function is ensured by a fourth transistor $T_4$, whose base receives loop-opening control pulses via a terminal 33, whose emitter is connected to the reference voltage, and whose collector is connected to the gate electrode of the first transistor $T_1$. When there is a positive control pulse on the base of the fourth transistor $T_4$, this transistor becomes conductive and brings the gate electrode of the first transistor $T_1$ to the reference voltage level, which results in this transistor being cut off so that there is only the bias resistance 20 left on the line terminals. This bias resistance is selected to have such a high value that it satisfies the conditions of the maximum current of the loop-opening phase.

FIG. 2 shows an improvement according to the invention permitting obtaining loop-opening and loop-closing pulses on the telephone line which have zero amplitude. This improvement consists of introducing a fifth transistor $T_5$ called a switching transistor whose main current path is situated between the capacitor 23 and the reference voltage. This fifth transistor $T_5$ has for its object to ensure a conductive link between the capacitor 23 and the reference voltage in normal operation, whereas this link is interrupted during a loop-opening pulse. In like manner the capacitor 23 is not subject to any charge variation during the switching phase while the line current assumes again the same value as the one existing before the switching operation. The fifth transistor $T_5$ may be coupled to the loop-opening control terminal 33 in any conceivable way to ensure the above operation. However, the simplest solution consists of connecting the gate electrode of the fifth transistor $T_5$ directly to the control terminal 33 while choosing therefore a P-channel field effect transistor (JFET).

In the same fashion as in FIG. 1, in the second embodiment of FIG. 2 the fact is shown that a specific number of elements may be integrated with the gain and control circuit element 10, represented in a dash-and-dot line box 35 defining a portion of the circuit 200 inclusive of the elements which are preferably integrated, that is to say: the diode D, the current source $S_1$, the transistors $T_2$, $T_3$ and $T_4$, and the voltage generator 30.

It is easy to understand that the components left outside the integrated circuits 10, 200 permit controlling the operating characteristic features of the telephone set as well as the components such as the first transistor $T_1$, the fifth transistor $T_5$ and the capacitors 18 and 23 which are not integrable for technological reasons.

The control function of the line current may easily be cancelled if so desired. It will be sufficient to omit the resistors 22 and 21b, to replace the capacitor 23 and the transistor $T_5$ with a direct link between the diode D and the reference voltage, and to realise a direct link between the output of the voltage generator 30 and the emitter of the second transistor $T_2$.

We claim:

1. A circuit arrangement for controlling line current in a telephone set, comprising:
   a rectifier bridge having two pairs of diagonally opposed connections,
   means for connecting a telephone line to one of said pairs,
   a first and a second line end portion respectively connected to the other of said pairs,
   a voltage gain and control circuit, having a modulation terminal and a reference terminal connected in a branch between said first and second line end portions, and
   a line current control circuit,
   a line current measuring element connected in said branch between said reference terminal and said second line end portion,
   said line current control circuit comprising a first transistor having a control electrode and a main current path, said main current path being connected in said branch in series with said gain and control circuit for introducing a controllable voltage drop in said branch,
   characterized in that said main current path is a sole current path between said first line end portion and said modulation terminal, and
   said control electrode is connected to said measuring element via said line current control circuit.

2. An arrangement as claimed in claim 1, characterized in that said gain and control circuit comprises a supply terminal, and
   the arrangement further comprises a conductive element for supplying current to said supply terminal, said conductive element having an input connected to said branch between said modulation terminal and said first transistor.

3. An arrangement as claimed in claim 1, characterized by comprising a loop-opening transistor having a base, an emitter and a collector, and
   means for providing control pulses for opening the loop of the telephone line, connected to the base of the loop-opening transistor,
   the emitter of the loop-opening transistor being connected to the second line end portion, and the collector being connected to the control electrode of the first transistor.

4. A circuit arrangement for controlling line current in a telephone set, comprising:
   a rectifier bridge having two pairs of diagonally opposed connections,
   means for connecting a telephone line to one of said pairs,
   a first and a second line end portion respectively connected to the other of said pairs,
   a voltage gain and control circuit, having a modulation terminal and a reference terminal connected in a branch between said first and second line end portions,
   a line current control circuit, and
   a line current measuring element connected in said branch between said reference terminal and said second line end portion,
   said line current control circuit comprising a first transistor having a control electrode and a main current path, said main current path being connected in said branch in series with said gain and control circuit for introducing a controllable voltage drop in said branch,
   characterized in that said main current path is a sole current path between said first line end portion and said modulation terminal, and
   said line current control circuit comprises a further control circuit connecting said control electrode to said measuring element, said further control circuit including a current source, a compensating diode receiving current from said current source and connected through a first conductive element to said measuring element, and amplifying means connecting from said compensating diode to said control electrode.

5. An arrangement as claimed in claim 4, characterized by comprising a loop-opening transistor having a base, an emitter and a collector, and
   means for providing control pulses for opening the loop of the telephone line, connected to the base of the loop-opening transistor,
   the emitter of the loop-opening transistor being connected to the second line end portion, and the collector being connected to the control electrode of the first transistor.

6. An arrangement as claimed in claim 4, characterized in that said first conductive element is part of a low pass filter, said diode has a diode terminal connected to said current source, and said amplifying means is connected to said diode terminal.

7. An arrangement as claimed in claim 6, characterized in that said gain and control circuit comprises a supply terminal,
   the arrangement further comprises a second conductive element for supplying current to said supply terminal, said second conductive element having an input connected to said branch between said modulation terminal and said first transistor, and
   said current source is connected between said supply terminal and said diode terminal.

8. An arrangement as claimed in claim 7, characterized in that said first conductive element is connected to a junction interconnecting said measuring element and said reference terminal.

9. A circuit arrangement for controlling line current in a telephone set, comprising:
   a rectifier bridge having two pairs of diagonally opposed connections,
   means for connecting a telephone line to one of said pairs, a first and a second line end portion respectively connected to the other of said pairs, a voltage gain and control circuit, having a modulation terminal and a reference terminal connected in a branch between said first and second line end portions, a line current control circuit, and a line current measuring element connected in said branch between said reference terminal and said second line end portion, said line current control circuit comprising a first transistor having a first control electrode and a main current path, said main current path being connected in said branch in series with said gain and control circuit for introducing a controllable voltage drop in said branch, characterized in that said main current path is a sole current path between said first line end portion and said modulation terminal, said line current control circuit comprises a bias resistor connecting said first control electrode to said first line end portion, a threshold voltage source having a given internal impedance, a second transistor having terminals defining a second current path and a second control electrode, and means for applying a voltage dependent on current flow through said measuring element to said second control electrode, and said second current path is connected between said first control electrode and said threshold voltage source.

10. An arrangement as claimed in claim 9, characterized by comprising a loop-opening transistor having a base, an emitter and a collecor, and means for providing control pulses for opening the loop of the telephone line, connected to the base of the loop-opening transistor, the emitter of the loop-opening transistor being connected to the second line end portion, and the collector being connected to the control electrode of the first transistor.

11. An arrangement as claimed in claim 9, characterized in that said threshold voltage source comprises a voltage generator having a low internal impedance and having output terminals interconnected by a divider bridge formed by two resistors in series, a junction between said two resistors constituting the threshold voltage source having a given internal impedance.

12. An arrangement as claimed in claim 11, characterized in that said second transistor terminals are an emitter, a collector, and a base; said emitter being connected to the threshold voltage source, and the base being the second control electrode.

13. An arrangement as claimed in claim 9, characterized in that said second transistor terminals are an emitter, a collector, and a base; said emitter being connected to the threshold voltage source, and the base being the second control electrode.

14. An arrangement as claimed in claim 9, characterized in that said threshold voltage source comprises a threshold resistor connected to said second line end portion, and a threshold current generator connected to and providing a current through said threshold resistor.

15. An arrangement as claimed in claim 14, characterized in that said means for applying a voltage comprises a further control circuit connecting said second control electrode to said measuring element, said further control circuit including a current source, a compensating diode receiving current from said current source, and a low-pass filter connecting between said compensating diode and said measuring element.

16. An arrangement as claimed in claim 15, characterized in that said compensating diode is a compensating transistor having base and collector electrodes connected to said second control electrode.

17. An arrangement as claimed in claim 16, characterized by comprising a loop-opening transistor having a base, an emitter and a collector, and means for providing control pulses for opening the loop of the telephone line, connected to the base of the loop-opening transistor, the emitter of the loop-opening transistor being connected to the second line end portion, and the collector being connected to the control electrode of the first transistor.

18. An arrangement as claimed in claim 17, further comprising a switching transistor having a main current path, and a gate electrode for receiving loop-opening pulses, characterized in that said low-pass filter is constituted by a filter resistor inserted between the reference terminal of the gain and control circuit element and the compensating diode, and a smoothing capacitor having one end connected to a junction between the filter resistor to the compensating diode, said smoothing capacitor having the other end connected to the reference voltage through the main current path of said switching transistor, and a polarity of said switching transistor is chosen to ensure interruption of the connection from the smoothing capacitor to the reference voltage in parallel with opening of the loop.

19. An arrangement as claimed in claim 15, characterized by comprising a loop-opening transistor having a base, an emitter and a collector, and means for providing control pulses for opening the loop of the telephone line, connected to the base of the loop-opening transistor, the emitter of the loop-opening transistor being connected to the second line end portion, and the collector being connected to the control electrode of the first transistor.

20. An arrangement as claimed in claim 19, further comprising a switching transistor having a main current path, and a gate electrode for receiving loop-opening pulses, characterized in that said low-pass filter is constituted by a filter resistor inserted between the reference terminal of the gain and control circuit element and the compensating diode, and a smoothing capacitor having one end connected to a junction between the filter resistor to the compensating diode, said smoothing capacitor having and the other end connected to the reference voltage through the main current path of said switching transistor, and a polarity of said switching transistor is chosen to ensure interruption of the connection from the smoothing capacitor to the reference voltage in parallel with opening of the loop.

* * * * *